United States Patent [19]

Gellert

[11] 4,330,258

[45] May 18, 1982

[54] INJECTION MOLDING MECHANICAL DOUBLE ACTING VALVE PIN ACTUATOR

[76] Inventor: Jobst U. Gellert, 7A Prince St., Glen Williams, Ontario, Canada

[21] Appl. No.: 201,559

[22] Filed: Oct. 28, 1980

[30] Foreign Application Priority Data

Oct. 15, 1980 [CA] Canada ................................. 362420

[51] Int. Cl.³ .............................................. B27F 1/05
[52] U.S. Cl. ................................... 425/564; 251/250; 425/566; 425/570
[58] Field of Search ....................... 425/564, 566, 570; 251/250

[56] References Cited

U.S. PATENT DOCUMENTS

| | | | |
|---|---|---|---|
| 2,629,629 | 2/1953 | Etnyre | 251/250 X |
| 4,212,627 | 7/1980 | Gellert | 425/564 |
| 4,268,240 | 5/1981 | Rees | 425/566 X |

Primary Examiner—Thomas P. Pavelko
Attorney, Agent, or Firm—Riches, McKenzie & Herbert

[57] ABSTRACT

This invention relates to mechanical double acting mechanism for actuating valve pins in a valve gated injection molding system. A number of valve gate units are aligned with a pneumatically driven toothed rack member. The rack member engages a hollow rotatable pinion member which is secured in each unit against transverse movement. The driven end of the valve pin is fixed in a bushing which extends through the pinion member and threadably engages it. The valve pin is actuated between the open and closed positions by longitudinally driving the rack member which rotates the pinion member and the bushing. In addition to providing a reliable and relatively inexpensive actuating mechanism, provision is made for relative axial adjustment of the valve pins prior to the commencement of operation which provides accurate valve seating without unduly high manufacturing tolerances.

6 Claims, 4 Drawing Figures

INJECTION MOLDING MECHANICAL DOUBLE ACTING VALVE PIN ACTUATOR

BACKGROUND OF THE INVENTION

This invention relates generally to valve gated injection molding and more particularly to an improved double acting mechanism for actuating the valve pins.

As shown, for instance, in the applicant's U.S. Pat. No. 4,222,733 which issued Sept. 16, 1980, it is known to use a pneumatically driven rocker arm as a valve pin actuator mechanism. However, this type of arrangement requires a separate mechanism and power source for each valve pin. In addition, it is single acting in that it only actuates the valve pin to the closed position and it is opened by the application of melt pressure after the air pressure is released.

The applicant's U.S. Pat. No. 4,212,627 which issued June 15, 1980 shows a valve pin actuating mechanism which uses a single power source to drive a number of valve pins but, once again, is single acting. In attempting to reduce costs and operating problems by using a single power source to drive a number of valve pins, one of the problems is providing for accurate seating of each of the valve pins. If there is no provision for adjustment of the position of each valve pin relative to the others, then they must all be made to extremely close tolerances which substantially increases costs and is a potential source of problems.

While single acting valve pin actuation is satisfactory for molding certain materials under certain conditions, it becomes a problem with more difficult to mold materials, such as glass filled polyester flame retardant material. In a normal single acting mechanism a film of the melt itself acts as a lubricant which allows the melt pressure to open the valve. However, under certain conditions this operation may be impaired by the film of melt being carbonized while the valve is closed. Furthermore, in order to avoid leakage with certain materials, it is necessary to reduce tolerances to the point where melt pressure cannot be relied upon to open the valve.

While double acting valve pin actuators are known, they are not mechanical mechanisms with provision for initial adjustment or calibration to facilitate a number of units being driven by a single power source.

SUMMARY OF THE INVENTION

Accordingly, it is an object of the present invention to at least partially overcome these disadvantages by providing a mechanical double acting valve pin actuator which facilitates driving a number of valve pins from a single power source with provision for initial adjustment of one relative to the others.

To this end, in one of its aspects, the invention provides a mechanism for reciprocally actuating an injection molding valve pin along its longitudinal axis comprising: an elongated toothed rack member reciprocable in a plane substantially transverse to the longitudinal axis of the valve pin, drive means for reciprocally driving the rack means in said plane according to a predetermined sequence, threaded means extending around a portion of and coaxial with said valve pin, and a hollow rotatable pinion member having a threaded inner surface and a toothed outer surface secured against substantial transverse movement, the valve pin extending through the pinion member with the threaded means in threadable engagement with the threaded inner surface, the toothed outer surface of the pinion member being in engageable contact with the rack member, whereby driving the rack member in one direction rotates the pinion member and actuates the valve pin along its longitudinal axis to a closed position, and driving the rack member in the opposite direction rotates the pinion member in the other direction and actuates the valve pin to an open position.

In another of its aspects, the invention further provides a mechanism for reciprocally actuating an injection molding valve pin having a tip end and enlarged driven end along its longitudinal axis comprising: an elongated toothed rack member reciprocable in a plane substantially transverse to the longitudinal axis of the valve pin, drive means for reciprocally driving the rack means in said plate according to a predetermined sequence, a bushing assembly including a hollow bushing with a threaded outer surface and a flange portion, a collar with an aperture to receive the bushing therethrough and a seat to receive the flange portion therein, and a plate located adjacent the collar to receive the flange portion of the bushing therebetween with fastening means to securely fasten the plate to the collar to frictionally secure the bushing and valve pin to the plate and collar, the bushing assembly being seated in the surrounding fixed member to prevent rotation but allow axial movement of the bushing assembly and valve pin, and a hollow rotatable pinion member having a threaded inner surface and a toothed outer surface secured against substantial transverse movement, the valve pin extending through the pinion member with the threaded outer surface of the bushing screwed into the threaded inner surface of the pinion member to position the tip end of the valve tip in a desired position before the valve pin is securely fastened to the bushing assembly, the toothed outer surface of the pinion member engaging the toothed rack member whereby driving the rack member in one direction rotates the pinion member and actuates the valve pin along its longitudinal axis to a closed position, and driving the rack member in the opposite direction rotates the pinion member in the other direction and actuates the valve pin to an open position.

Further objects and advantages of the invention will appear from the following description taken together with the accompanying drawings.

DETAILED DESCRIPTION OF THE DRAWINGS

Figure 1:
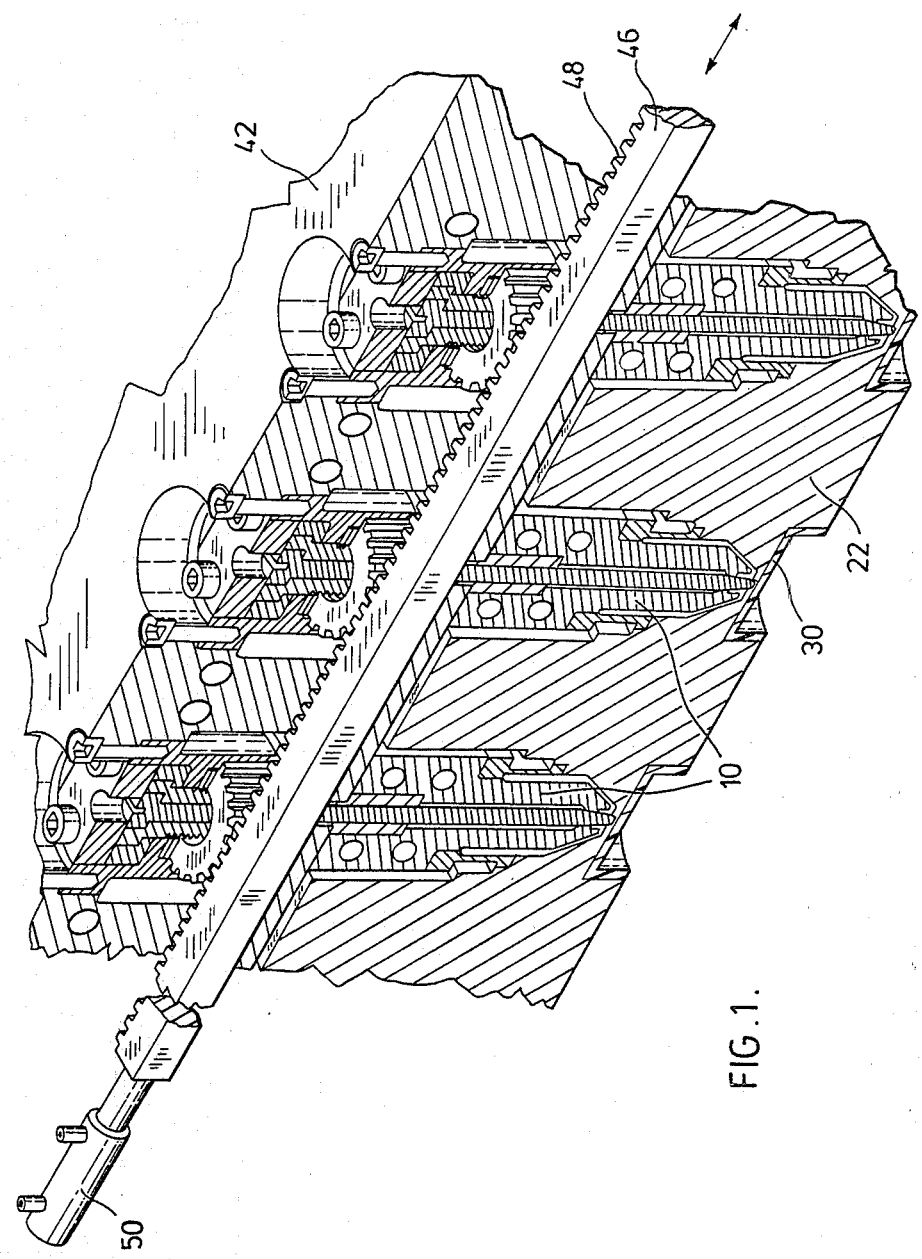
FIG. 1 is a partial perspective view showing a valve pin actuator mechanism according to a preferred embodiment of the invention.
Figure 2:
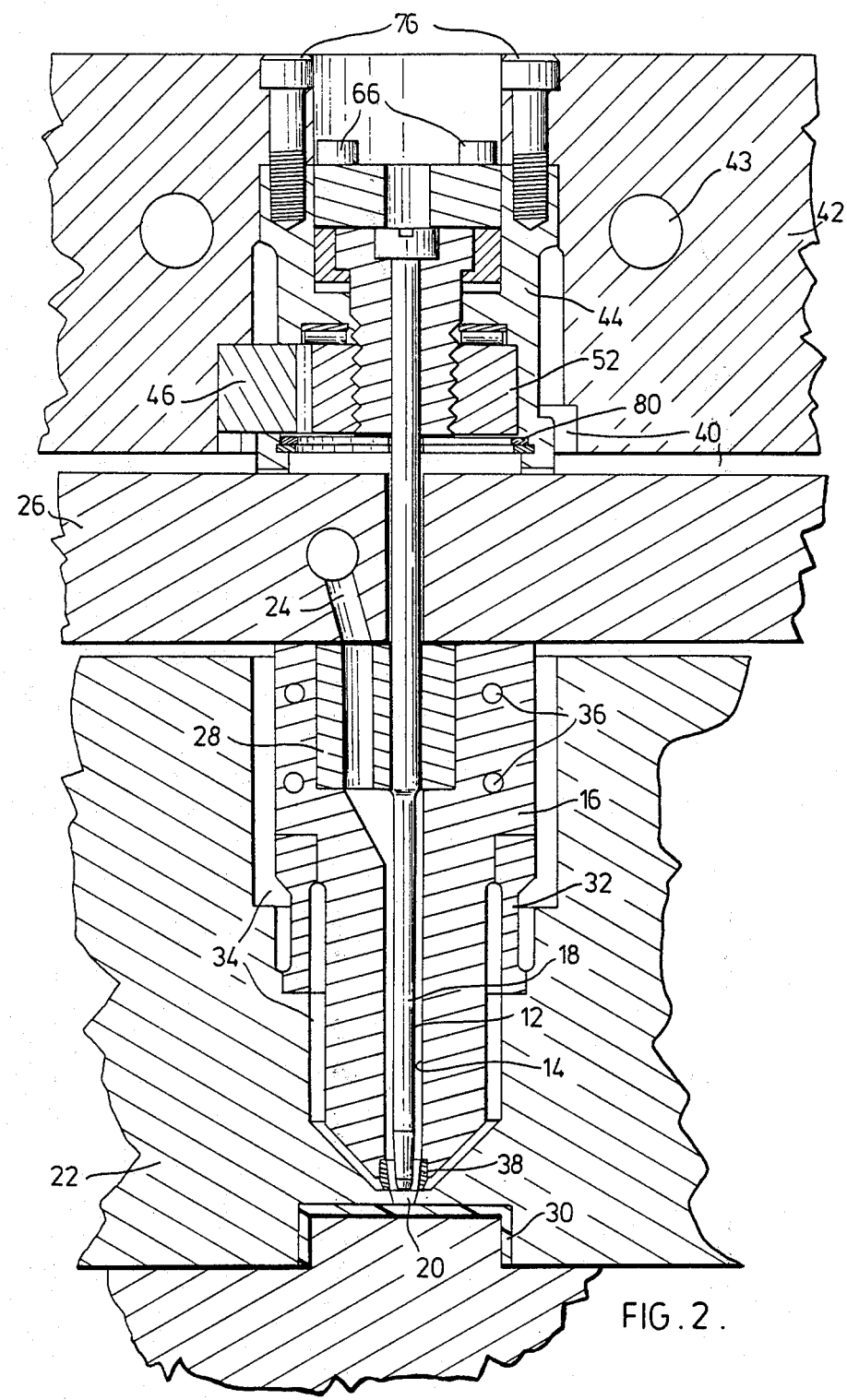
FIG. 2 is a sectional view, of one of the valve gate units.

Reference is first made to FIG. 1 which shows mechanism for simultaneously actuating a number of aligned valve gate units 10. As the valve gate units are identical, they are herein described and illustrated using the same reference numerals for common components. In each, as clearly seen in FIG. 2, an elongated valve pin 12 is located in a cylindrical bore 14 in a heater cast 16. The valve pin 12 has a central longitudinal axis 18 in alignment with a gate 20 in a cavity plate 22. Pressurized melt flows from a molding machine (not shown), through a hot runner passage 24 which extends through manifold spreader plate 26, through a bushing seal 28 seated in the heater cast 16, around the valve pin 12, through the gate 20, and into a cavity 30. The heater cast 16 is securely seated in the cavity plate 22 by an insulation bushing 32. Air space 34 is provided between the heater cast 16 which is heated by electrical heating element 36 and the cooled cavity plate 22. A generally cylindrical nozzle seal 38 is seated in the heater cast 16 and extends across the air space 34 to abut on the cavity plate 22 around the gate 20. Another insulative air space 40 is provided between back plate 42 which is cooled by cooling element 43 and the hot manifold spreader plate 26 and retaining and insulating bushing 44. An elongated rack member 46 with teeth 48 extends along the aligned valve gate units 10 and is reciprocally driven by pneumatic cylinder 50. In this embodiment, the cavity plate 22, spreader plate 26 and the back plate 42 are all formed of steel, the heater cast 16 is formed of a beryllium copper alloy and the nozzle seal 38 is formed of a titanium steel alloy.

Figure 3:
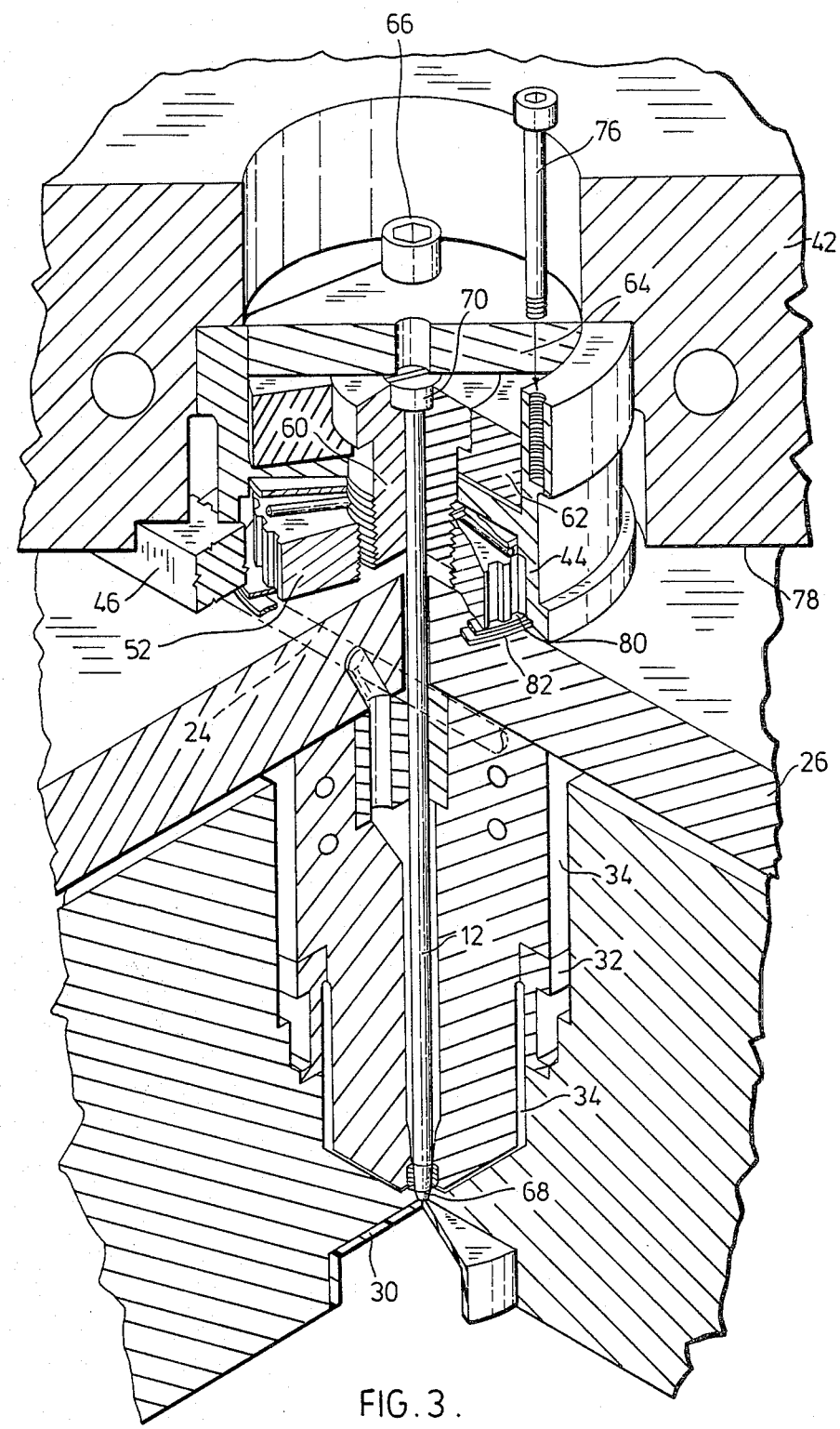
FIG. 3 is a cut-away view showing a portion of the mechanism according to the preferred embodiment.
Figure 4:
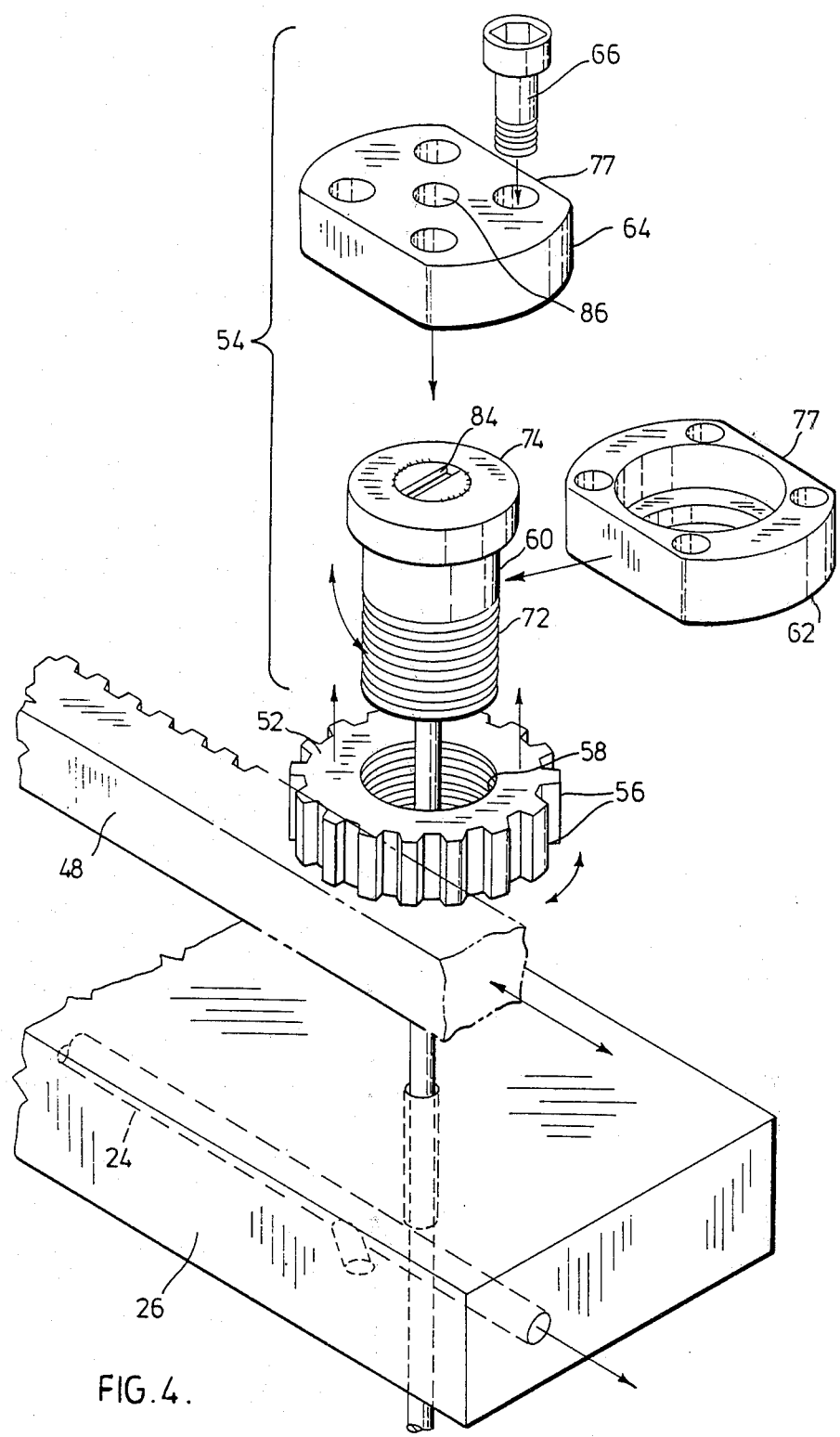
FIG. 4 is an exploded view of a portion of the mechanism seen in FIG. 3.

Referring particularly to FIGS. 3 and 4, each unit has a hollow pinion member 52 and a bushing assembly 54. The pinion member has teeth 56 on its outer surface which engage the teeth 48 of the rack member 46 and threads 58 on its inner surface. The bushing assembly 54 includes a hollow bushing 60, a collar 62, a plate 64 and bolts 66 which fasten the plate 64 to the collar 62. The valve pin 12 extends through the bushing 60 and has a tip end 68 and an enlarged driven end 70 which seats in the bushing 60. The bushing 60 extends through the pinion member 52 and has a partially threaded outer surface 72 which engages the threads 58 on the inner surface of the pinion member 52. An outer flange portion 74 of the bushing 60 extends between the collar 62 and the plate 64 whereby the bushing assembly 54 and the valve pin 12 are secured as a rigid unit when the bolts 66 are tightened. The retaining bushing 44 is secured to the back plate 42 by bolts 76 and the collar 62 and plate 64 have flat sides 77 to match the shape of the recess in the retaining bushing 44, whereby the rigid bushing assembly and valve pin are secured against rotational movement but able to move in the direction of the longitudinal axis of the valve pin. The pinion member 52 is rotatable, but is located in the retaining bushing 44 so as to be secured against transverse movement. It is positioned between bushing 44 and thrust bearing 78 and washer 80, which in turn is retained by snap ring 82 seated in the retaining bushing 44.

In use, each valve gate unit 10 is assembled with the valve pin 12 fixed to the bushing 60 by brazing around the enlarged end 70 or some other suitable method. The enlarged end 70 of the valve pin 12 has a slot 84 which is located in alignment with a central opening 86 in the plate 64. This provides for adjustment of each valve pin 12 relative to the others to ensure accurate seating of the valve pin tip end 68 in the gate 20. After assembly but before bolts 66 are tightened, with the rack member 46 in the closed position, a screwdriver is inserted through the opening 86 to the slot 84 to rotate the valve pin 12 and the bushing 60 to which it is fixed. With the pinion member 52 being held by its engagement with the rack member 46, this results in axial movement of the valve pin 12 as the bushing 60 is screwed into or out of the pinion member 52 depending upon the direction of rotation. Each valve pin 12 is thus adjusted so that it just seats in the gate 20 in the closed position and the respective bolts 66 are then tightened. This may, of course, be repeated after a period of use to adjust for uneven wear. This facility for relative adjustment of the valve pin reduces the tolerances to which they must be made to allow for them being driven from a single power source without excessive malfunction.

In operation, the cylinder 50 is pneumatically reciprocated according to a repetitive cycle. This moves the elongated rack member 46 which rotates each of the pinion members 52. This, in turn, rotates the bushing 60 and the valve pin 12 which actuates it in the open or closed direction according to the direction of movement of the rack member 46. If additional power is required, the cylinder 50 may be hydraulic rather than pneumatic. Operation of the cylinder 50 is controlled by means (not shown) which, in conjunction with the operation of the molding machine to supply pressurized melt and open and close the cavities, will provide a continuous operating cycle. While the pressures and times of the cycle are determined depending upon the type of melt and the product, one example by way of illustration only would include the following steps:

1. close mold at low melt pressure—approximately $\frac{1}{2}$ second.
2. apply high melt pressure and acutate the rack member 46 to the gate open position.
3. inject at high melt pressure—approximately 1 second.
4. pack at high melt pressure—approximately 2 seconds.
5. actuate the rack member 46 to the gate closed position and reduce melt pressure.
6. hold for cooling—approximately 3 seconds.
7. open mold to eject—approximately 2 seconds.
8. repeat 1.

Although the description of this mechanical double acting valve pin actuator has been given with respect to a particular embodiment, it is not to be construed in a limiting sense. Variations and modifications thereof will occur to those skilled in the art. For a definition of the invention, reference is made to the appended claims.

What I claim is:

1. Mechanism for reciprocally actuating an injection molding valve pin along its longitudinal axis comprising:
    (a) an elongated valve pin adapted to be secured against rotational motion,
    (b) an elongated toothed rack member reciprocable in a plane substantially transverse to the longitudinal axis of the valve pin,
    (c) drive means for reciprocally driving the rack means in said plane according to a predetermined sequence,
    (d) threaded means extending around a portion of and coaxial with said valve pin, said threaded means adapted to be secured to the valve pin, and
    (e) a hollow rotatable pinion member having a threaded inner surface and a toothed outer surface secured against substantial transverse movement, the valve pin extending through the pinion member with the threaded means in threadable engagement with the threaded inner surface, the toothed outer surface of the pinion member being in engageable contact with the rack member, whereby driving the rack member in one direction rotates the pinion member and actuates the valve pin along its longitudinal axis to a closed position, and driving the rack member in the opposite direction rotates the pinion member in the other direction and actuates the valve pin to an open position.

2. Mechanism as claimed in claim 1 wherein said threaded means comprises a bushing assembly including a bushing having a threaded outer surface to be screwed into the pinion member, the bushing assembly adapted to be axially adjustably positioned relative to the pinion member and then secured to the valve pin, the bushing assembly and valve pin being secured against rotation but axially movable by the pinion member.

3. Mechanism as claimed in claim 1, the valve pin having a tip end and a driven end, said threaded means comprising a bushing assembly including a hollow bushing with a threaded outer surface which receives the driven end of the valve pin, whereby the bushing is screwed into the pinion member to a predetermined position and the driven end of the valve pin is then secured to the bushing assembly, the bushing assembly and valve pin being secured against rotation.

4. Mechanism for reciprocally actuating an injection molding valve pin having a tip end and enlarged driven end along its longitudinal axis comprising:
 (a) an elongated valve pin,
 (b) an elongated toothed rack member reciprocable in a plane substantially transverse to the longitudinal axis of the valve pin,
 (c) drive means for reciprocally driving the rack means in said plane according to a predetermined sequence,
 (d) a bushing assembly including a hollow bushing with a threaded outer surface and a flange portion, a collar with an aperture to receive the bushing therethrough and a seat to receive the flange portion therein, and a plate located adjacent the collar to receive the flange portion of the bushing therebetween with fastening means to securely fasten the plate to the collar to frictionally secure the bushing and valve pin to the plate and collar, the bushing assembly being seated in the surrounding fixed member to prevent rotation but allow axial movement of the bushing assembly and valve pin, and
 (e) a hollow rotatable pinion member having a threaded inner surface and a toothed outer surface secured against substantial transverse movement, the valve pin extending through the pinion member with the threaded outer surface of the bushing screwed into the threaded inner surface of the pinion member to position the tip end of the valve tip in a desired position before the valve pin is securely fastened to the bushing assembly, the toothed outer surface of the pinion member engaging the toothed rack member, whereby driving the rack member in one direction rotates the pinion member and actuates the valve pin along its longitudinal axis to a closed position, and driving the rack member in the opposite direction rotates the pinion member in the other direction and actuates the valve pin to an open position.

5. Mechanism as claimed in claim 4 wherein the plate is fastened to the collar by bolts and an opening is provided through the plate providing for rotation of the valve pin and bushing to axially adjust the valve pin to accurately seat the tip end before said bolts are completely tightened to prevent rotation of the valve pin and bushing.

6. Mechanism as claimed in claim 2, 4 or 5 wherein the drive means is pneumatically operated.

* * * * *